Figure 1:
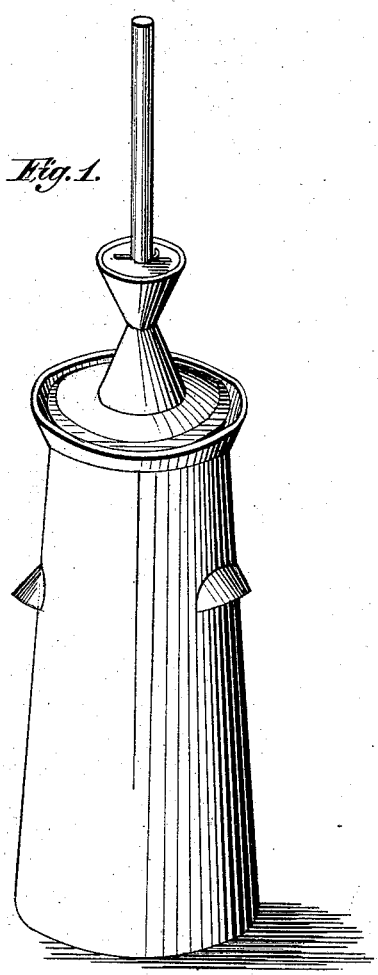
Figure 2:
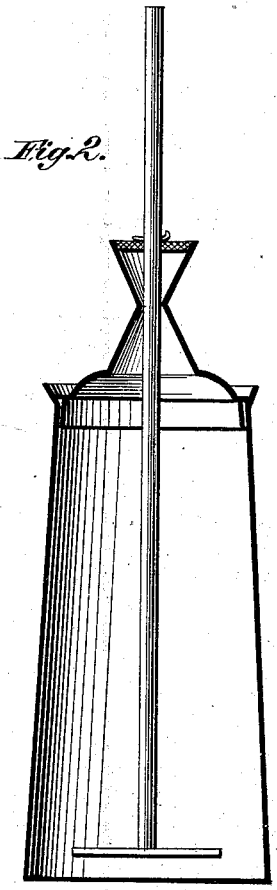

R. S. BRUSIE.
CHURNS.

No. 187,594. Patented Feb. 20, 1877.

Witnesses:
C. L. Street
M. D. Jennings

Inventor:
Rebecca Sarah Brusie

UNITED STATES PATENT OFFICE.

REBECCA SARAH BRUSIE, OF SONORA, CALIFORNIA.

IMPROVEMENT IN CHURNS.

Specification forming part of Letters Patent No. 187,594, dated February 20, 1877; application filed June 26, 1876.

*To all whom it may concern:*

Be it known that I, REBECCA SARAH BRUSIE, of Sonora, in the county of Tuolumne, State of California, have invented certain Improvements in the lid and dasher to a Churn, of which the following is a specification:

My invention consists in the construction of a lid to a churn so as to form two air-chambers, formed by two truncated cones, the truncated surfaces joined together, and the plunger or dasher passing through the center of the cones, with a leather, or tin, or rubber, or wood, or other substance attached to the plunger or dasher above the upper cone, so that when the dasher is down the disk or object thus attached to the dasher forms the lid or upper part of the upper air-chamber, thereby effectually preventing the cream in the churn from escaping or spattering when the churning is going on.

I claim as my invention—

The two truncated cones above described, and the attachment to the dasher, as above described, and for the purposes hereinbefore set forth.

In witness whereof I have hereunto set my hand this 15th day of June, A. D. 1876.

REBECCA SARAH BRUSIE.

Witnesses:
C. L. STREET,
M. D. JENNINGS.